US012710618B2

(12) United States Patent
Pesch et al.

(10) Patent No.: US 12,710,618 B2
(45) Date of Patent: Aug. 18, 2026

(54) USE OF AN ADDITIONAL OPTICAL ELEMENT, A LENS SYSTEM AND A CAMERA SYSTEM

(71) Applicant: Arnold & Richter Cine Technik Gmbh & Co. Betriebs KG, Munich (DE)

(72) Inventors: Matthias Pesch, Munich (DE); Cornelius Hecker, Munich (DE)

(73) Assignee: Arnold & Richter Cine Technik Gmbh & Co. Betriebs KG, Munich (DE)

( * ) Notice: Subject to any disclaimer, the term of this patent is extended or adjusted under 35 U.S.C. 154(b) by 371 days.

(21) Appl. No.: 18/422,463

(22) Filed: Jan. 25, 2024

(65) Prior Publication Data

US 2025/0244557 A1 Jul. 31, 2025

(30) Foreign Application Priority Data

Jan. 20, 2023 (DE) ......................... 102023101416.1

(51) Int. Cl.

| | |
|---|---|
| ***G02B 7/14*** | (2021.01) |
| ***G02B 3/04*** | (2006.01) |
| ***G02B 13/18*** | (2006.01) |
| ***G02B 15/10*** | (2006.01) |
| ***G03B 17/56*** | (2021.01) |
| ***H04N 23/55*** | (2023.01) |

(52) U.S. Cl.

CPC ................. *G02B 7/14* (2013.01); *G02B 3/04* (2013.01); *G02B 13/18* (2013.01); *G02B 15/10* (2013.01); *G03B 17/565* (2013.01); *H04N 23/55* (2023.01)

(58) Field of Classification Search

CPC . G02B 7/14; G02B 3/04; G02B 13/18; G02B 15/10; G03B 17/565; H04N 23/55

See application file for complete search history.

(56) References Cited

U.S. PATENT DOCUMENTS

| | | | |
|---|---|---|---|
| 3,305,294 | A | 2/1967 | Alvarez |
| 6,157,781 | A | 12/2000 | Konno et al. |

(Continued)

FOREIGN PATENT DOCUMENTS

| | | | |
|---|---|---|---|
| DE | 102014118383 A1 | 6/2016 | |
| EP | 1667437 A1 | 6/2006 | |

(Continued)

OTHER PUBLICATIONS

EP 1220001 A1 machine translation (Year: 2002).*

(Continued)

*Primary Examiner* — James A Dudek

(74) *Attorney, Agent, or Firm* — Amster, Rothstein & Ebenstein LLP

(57) ABSTRACT

An additional optical element with a positive optical power is used to influence an optical image produced by the camera lens on the image sensor by inserting the additional optical element between a camera lens and an image sensor of a camera, wherein the center thickness of the additional optical element and the optical power of the additional optical element are matched to one another in such a way that, for a predetermined diaphragm setting of the camera lens, a flange focal distance defined by the camera lens remains substantially unchanged by the insertion of the additional optical element.

11 Claims, 6 Drawing Sheets

(56) References Cited

U.S. PATENT DOCUMENTS

Figure 1:
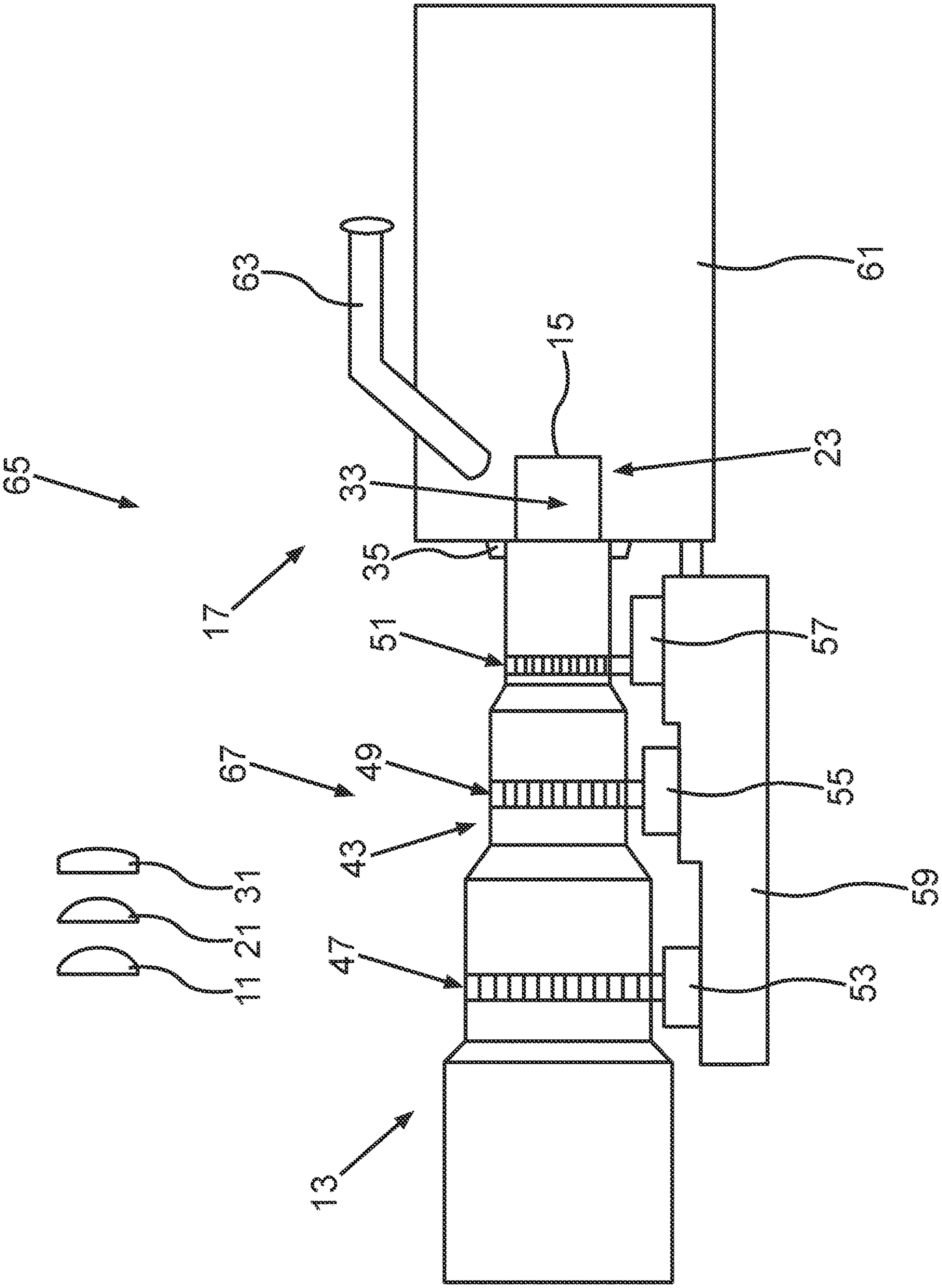

| | | | | |
|---|---|---|---|---|
| 6,167,206 | A | 12/2000 | Hylen | |
| 7,720,368 | B2 | 5/2010 | Hurd | |
| 7,753,603 | B2 | 7/2010 | Kawai | |
| 8,780,260 | B2 | 7/2014 | Kobayashi | |
| 2012/0262624 | A1 | 10/2012 | Takemoto et al. | |
| 2016/0299338 | A1* | 10/2016 | Aoki ........................ | G03B 5/00 |
| 2017/0123298 | A1* | 5/2017 | Hine ........................ | G02B 7/14 |

FOREIGN PATENT DOCUMENTS

| | | | |
|---|---|---|---|
| EP | 2500758 | A1 | 9/2012 |
| EP | 2590016 | A1 | 5/2013 |
| WO | 2003050609 | A1 | 6/2003 |

OTHER PUBLICATIONS

German Search Report issued in Application No. 10 2023 101 416.1, dated Sep. 22, 2023.

Nikon 105mm DC 2.0AF User Manual—DC105_2D_(27_DL)02 (copyright 1993).

ARRI Signature Primes & Zooms brochure (Oct. 2021).

Extended European Search Report issued in EP Application No. 24150769.8, dated May 29, 2024.

* cited by examiner

USE OF AN ADDITIONAL OPTICAL ELEMENT, A LENS SYSTEM AND A CAMERA SYSTEM

The invention relates to the use of an additional optical element for influencing an optical image produced by a camera lens on an image sensor of a camera, a lens system comprising a camera lens, which can be selectively coupled to a camera, and an additional optical element, and a camera system with a camera and such a lens system.

For professional moving image recordings, in particular cameras with interchangeable lenses which can be selectively coupled to a lens mount of the camera body of the camera and which may differ, for example, in their focal length may be used in order to be able to equip the camera with a camera lens adapted to a particular recording situation. Different interchangeable lenses of a lens series may also be matched to each other in such a way that a subjective image impression and, for example, color reproduction or resolution power are maintained when the camera lens is changed, and the change of the camera lens only then stands out in the recording by a change in the object angle. The generic term "lens" or "camera lens" as used herein is to be understood as comprising a plurality of optical elements, including individual lenses, forming the objective of the camera.

In particular, interchangeable lenses may also be selected for professional moving image recordings with regard to the respective image appearance produced in order to achieve a certain recording "look". So-called vintage-lenses, such as camera lenses from the 1960s, may create a frequently preferred "look". Such a "look" may also be desired for today's modern recordings.

Such vintage-lenses for example may have a limited imaging performance compared to today's professional camera lenses so that aberrations may occur in an image produced by the camera using a vintage-lens, which may, however, determine especially the characteristic bokeh or the desired picture appearance of the image. Modern camera lenses, on the other hand, are generally corrected as precisely as possible with regard to such aberrations in order to avoid aberrations and to obtain consistently sharp, high-resolution images.

In order to nevertheless achieve the desired image appearance of a vintage lens, lens sets of old camera lenses, from about the 1960s, may also be used for example in modern moving image recordings and be equipped with an adapted, modern mechanism so that the old lens sets may be used in conjunction with present state-of-the-art cameras. In addition, camera lenses that are well corrected for optical aberrations, for example, may be deliberately adjusted out of this well corrected state by changing the distance between the lenses, for example, in order to deliberately produce aberrations and recreate the "look" of a vintage-lens.

Furthermore, it is generally known to use additional optical elements in order to change the imaging characteristics of an optical system. For example, so-called effect filters, in particular flat glass plates, may be placed in front of the lens, which may introduce targeted stray light into the system in order to produce aberrations.

In addition, such additional optical elements generally may also be placed between the camera lens and the camera, for which purpose an adapter may be inserted between the camera lens and the camera, for example, and into which the additional optical elements may be inserted.

However, the actual use of vintage-lenses poses the problem that the age of the camera lenses and their decades of use often mean that the optics are in poor condition and that also other parameters of the camera lenses are technically outdated, for example, the optical elements may have inadequate anti-reflective coatings. On the other hand, the readjustment of corrected camera lenses so as to produce the desired aberrations often requires a major and involved constructive intervention in the camera lens, which may only be carried out by experienced service technicians. In addition, any improper handling may possibly result in damage to the camera lens and it may be difficult to restore the camera lens to its original state or to a fully corrected state after such a readjustment.

Furthermore, when using a different camera lens or an additional optical element, the so-called flange focal distance must be observed. The flange focal distance at the camera corresponds to the distance between the image plane (i.e. the plane of the image sensor) and the support plane for the camera lens to be coupled. A camera lens is designed for a specific flange focal distance of the associated camera, i.e. the optics of a camera lens define a flange focal distance which must correspond to the flange focal distance of the camera used so that the focusing of the camera lens matches the focus scale (distance scale) on it. In the following, the flange focal distance of a lens is understood as the distance between the contact surface of the lens at the lens mount and the axial focus point produced by the lens optics.

However, attaching an additional optical element between the camera lens and the camera may change the flange focal distance defined (purely) by the camera lens, so that in use, the focus scale of the camera lens is distorted and it becomes more difficult to adjust the focus. Furthermore, in particular as a result of significant changes to the flange focal distance, it may also be no longer possible to reach focal ranges that can generally be reached by the camera lens, so that the introduction of the additional optical element may be accompanied by limited applications of the camera lens. Although it may generally be attempted to mechanically compensate for the change in flange focal distance by using shims, for example, any short-term adjustments, particularly on a film set, usually cannot be implemented due to the limited time available, so that the changed flange focal distance and the resulting difficulty in adjusting the focus usually have to be accepted.

It is therefore an object of the invention to provide a possibility for influencing an optical image produced by a camera lens on an image sensor of a camera and, in particular, for specifically producing aberrations, which may be implemented as simply and reliably as possible without any great constructive effort.

This object is achieved by the use of an additional optical element according to the features of independent claim 1.

According to claim 1, an additional optical element with a positive optical power is used to influence an optical image produced by a camera lens on an image sensor of a camera, wherein the optical image is influenced by inserting the additional optical element between the camera lens and the image sensor of the camera. An additional optical element is used whose center thickness and optical power are matched to one another in such a way that, for a predetermined diaphragm setting of the camera lens, a flange focal distance defined by the camera lens remains substantially unchanged by the insertion of the additional optical element.

By using an additional optical element to change an optical image produced by the camera lens on the image sensor of the camera, it is therefore not necessary to revert to an actual vintage-lens or to change the calibration of the optics of the camera lens in order to achieve the desired influence on the optical image. Rather, in general, a modern camera lens corrected with regard to aberrations may be used, the mechanics and parameters of which may be configured entirely according to the current state of the art.

The center thickness and the optical power of the additional optical element are matched to one another in such a way that, at least for a predetermined diaphragm setting of the camera lens, a flange focal distance defined by the camera lens remains substantially unchanged by the insertion of the additional optical element. This means that the system of camera lens and an additional optical element, at least for a predetermined diaphragm setting of the camera lens, defines the same flange focal distance as for the camera lens alone, which is designed for a respective camera. This may prevent the focus scale of the lens from changing when the additional optical element is inserted. In this respect, the control of the camera lens and the settings or imaging parameters defined by the camera lens may also remain unchanged when the additional optical element is inserted. The optical power of the additional optical element is generally determined by the index of refraction of the material and the radius of curvature of the lens(es) used in the additional optical element.

To some extent, two opposing effects may be compensated for by using an additional optical element with a positive optical power. At first, the insertion of the additional optical element as an additional glass path in a beam path through the camera lens to the image sensor of the camera is generally accompanied by an increase in the flange focal distance defined by the camera lens, so that a focal point determined by the camera lens shifts away from the camera lens. This shift may be described in particular as a flange focal distance increase $\Delta s_1$. Such a flange focal distance increase $\Delta s_1$ may be calculated for a flat plate (i.e. plane-parallel plate) of thickness d or approximated for an additional optical element of center thickness d with a large radius of curvature and correspondingly low refraction as:

$$\Delta s_1 = d\frac{n-1}{n},$$

where n is the index of refraction of the material of the flat plate.

However, due to the use of an additional optical element with positive optical power, a converging beam behind the camera lens may be more focused and the focal point may be shifted in the direction of the camera lens, so that the explained flange focus distance increase is compensated for by a corresponding matching between the center thickness and the optical power of the additional optical element and the flange focus distance defined by the camera lens may remain substantially unchanged by the insertion of the additional optical element, i.e. is not changed by the combination of camera lens and an additional optical element.

For an ideally thin single lens with a positive optical power placed in the converging beam path between the camera lens and the image plane, the flange focal distance change $\Delta s_2$ can be calculated as $$\Delta s_2 = \left(\frac{1}{f_z} + \frac{1}{u}\right)^{-1} - u,$$

where $f_z$ is the focal length of the single lens and u is the distance of the single lens from the focal point of the camera lens.

Said contributions to the change in flange focal distance compensate each other, when $$\Delta s_1 = -\Delta s_2,$$

and therefore, if the index of refraction n is specified by the choice of an optical material and a positive optical power $1/f_z$ is specified, the thickness d of a flat plate required for compensation may be approximated as $$d = -\frac{n}{n-1}\left(\left(\frac{1}{f_z} + \frac{1}{u}\right)^{-1} - u\right)$$

In relation to the focal length, by inserting the additional optical element in the manner described, the focal length $f_S$ of the system consisting of the camera lens (with focal length $f_K$) and the additional optical element (with focal length $f_z$) is given by:

$$f_S = \frac{f_K}{u}\left(\left(\frac{1}{f_z} + \frac{1}{u}\right)^{-1}\right).$$

The idealized estimates shown here enables a general design of the additional optical element. The detailed optimization of the required center thickness, considering the desired surface geometries, materials and position of the additional optical element in the beam path, is easily possible for the experienced optical designer, especially when using common software for computer-aided optical design.

The described compensation effect may be achieved at least for a predetermined diaphragm setting of the camera lens. In this context, a diaphragm setting is to be understood as a setting value of a variable diaphragm of the camera lens, for example, an iris diaphragm. Such a setting value corresponds to a predetermined opening width of the diaphragm. In particular, the diaphragm may be arranged in or near a main plane of the camera lens.

In particular, the insertion of the additional optical element therefore makes it possible to achieve an unchanged focus in an image center or at a point at which an optical axis of the camera lens meets the image sensor, when the additional optical element is inserted. On the other hand, the additional optical element may be configured, for example, by a variable curvature of a lens surface, to generate aberrations and, for example, spherical aberrations, so that a sharpness of an image produced on the image sensor may be specifically influenced by the insertion of the additional optical element. For example, the image sharpness may be deliberately reduced towards the edges of the image or of the image sensor by inserting the additional optical element in order to be able to reproduce a “look” or the image appearance of a vintage-lens with reduced sharpness performance.

Furthermore, such additional optical elements also offer the possibility of using different additional optical elements for influencing an optical image produced by a particular camera lens on the image sensor, in that a respective one of the different additional optical elements is inserted between the camera lens and the image sensor of the camera. The additional optical elements may all have a positive optical power which is matched to the center thickness of the respective additional optical element in such a way that, for a specific diaphragm setting, a flange focal distance defined by the camera lens remains substantially unchanged by the insertion of a respective one of the additional optical elements. However, the respective lens deflections or curvatures of the surfaces of the additional optical elements, for example, may differ from one another, so that the additional optical elements may be configured to generate different types of optical aberrations. Therefore, for example, a set of additional optical elements may be made available and/or be used, which may be selectively inserted between the camera lens and the image sensor of the camera without changing the flange focal distance defined by the camera lens, whereby desired aberrations may be specifically generated by inserting a respective additional optical element.

However, the insertion of an additional optical element and any spherical aberrations generated by the additional optical element may result in a dependence of the axial position of the best focus point on the set diaphragm setting of the lens, so that the design of the additional optical elements generally must take into account the desired diaphragm setting and, if required, may only ensure that the flange focal distance is maintained for this diaphragm setting. If the camera lens is operated with different diaphragm settings, deviations in the focus position may therefore occur, whereby however, this effect may also occur particularly for vintage-lenses with relevant spherical aberrations, and therefore may be taken into account by users or even be desired to reproduce a vintage-lens. Optimizing the position of the best focus point to the desired diaphragm setting depends on the desired criteria for the best focus point, but for the experienced designer is easily done.

Further embodiments may be taken from the dependent claims, the description and the figures.

In some embodiments, the additional optical element may be configured to generate spherical aberrations. Alternatively or additionally, in some embodiments, the additional optical element may be configured to reduce overall the sharpness of the camera lens, so that the insertion of the additional optical element may, for example, also lead to a reduced sharpness at the center of an image or at an intersection point between an optical axis of the camera lens and the image sensor.

Starting from the intersection point between the optical axis and the image sensor, the sharpness of the image may also be further reduced and/or increasingly reduced for example in the direction of the image edges and/or radially with respect to the optical axis when the additional optical element is inserted, whereby still further aberrations, such as an image field curvature or a coma aberration, may even be added towards the edge of the image field. Such a sharpness contour is often also a characteristic of vintage-lenses which may be reproduced by using the additional optical element.

In some embodiments, the additional optical element may be inserted within the back focal distance of the camera lens.

In some embodiments, at least one surface of the additional optical element, in particular a surface facing away from the camera lens and/or a surface of the additional optical element facing the camera lens, may be formed aspherical at least in sections.

For example, a surface of the additional optical element facing away from the camera lens and/or a surface of the additional optical element facing the camera lens may have an irregular curvature, so that rays incident on the additional optical element may be refracted to different degrees depending on the point of incidence on and/or the point of exit from the additional optical element, and desired location-dependent aberrations may be generated. In addition, in some embodiments, the surface of the additional optical element facing away from the camera lens and/or facing the camera lens may be formed flat in sections and/or comprise a plurality of flatly-formed surface sections oriented at different angles to the optical axis, in order to also generate a position-dependent optical power of the additional optical element and location-dependent optical aberrations.

In some embodiments, the additional optical element may be accommodated in a cavity between the camera lens and the camera. In particular, it may be provided for, that the additional optical element is inserted into a receiver provided at the camera lens or at the camera when the camera lens is mounted to the camera, so that in particular no adapter needs to be connected to the camera and/or the camera lens in order to be able to insert the additional optical element. As a result, a mechanical distance measure of the camera lens as the distance between a mounting surface of the camera lens on a camera body and the image sensor of the camera, may remain unchanged when the additional optical element is inserted. Moreover, since the flange focal distance determined by the camera lens is also not (substantially) changed by the insertion of the additional optical element due to the matching between the optical power and the center thickness of the additional optical element, in particular, a focus scale of the camera lens may therefore be retained when the additional optical element is inserted.

In some embodiments, the cavity in which the additional optical element is accommodated may be formed partially in the camera lens and partially in the camera (i.e. on both sides of the lens mount of the camera, for example, on both sides of a contact surface of the camera body for the camera lens). In other embodiments, the cavity for the additional optical element may be formed entirely in the camera lens or entirely in the camera.

Furthermore, in some embodiments, the additional optical element may firstly be connected to the camera lens in order to then mount the camera lens to the camera.

In some embodiments, the additional optical element may be configured to be inserted between the camera lens and the camera in such a way that the camera lens can be coupled directly to a lens mount of the camera even when the additional optical element is used, i.e. in the same way and arrangement as would be without an additional optical element. In other words, the camera lens may be mounted to the camera in the same way when the additional optical element is inserted as for when the camera lens is mounted when no additional optical element is inserted. For this purpose, the additional optical element mounted to the camera lens may be insertable into a cavity provided at a camera body or into an axial opening provided at the camera body, for example, whereas the camera lens may be mountable to the camera body, a lens mount provided thereon and/or a boundary of the cavity.

The invention also relates to a method for influencing an optical image which is produced by a camera lens on an image sensor of a camera, in which an additional optical element with a positive optical power is inserted between the camera lens and the image sensor of the camera, the center thickness and optical power of which are matched to one another in such a way that, for a predetermined diaphragm setting of the camera lens, a flange focal distance defined by the camera lens remains substantially unchanged by the insertion of the additional optical element, as explained above.

The invention also relates to a lens system comprising a camera lens which can be selectively coupled to a camera and an additional optical element with a positive optical power which can be inserted between the camera lens and an image sensor of the camera, wherein the center thickness and the optical power of the additional optical element are matched to one another in such a way that, for a predetermined diaphragm setting of the camera lens, a flange focal distance defined by the camera lens remains substantially unchanged by the insertion of the additional optical element. The additional optical element of such a lens system may generally be configured and arranged as explained above in connection with the use of the additional optical element according to the invention.

As already explained, such an additional optical element makes it possible in particular to specifically influence an optical image produced on the image sensor of the camera when using the camera lens without the insertion of the additional optical element being accompanied by a change in a focus scale of the camera lens or requiring a constructive change to the camera lens and/or the camera. The additional optical element therefore makes it possible to use the camera lens selectively with or without the additional optical element being inserted, whereby a controlling of the camera lens does not have to be adapted or changed due to the insertion of the additional optical element. By inserting an appropriately designed additional optical element, it is therefore possible to easily replicate a vintage-lens when using a modern camera lens, for example. However, in order to revert back when required to the unchanged, modern and in particular an optical-aberrations-corrected camera lens and its imaging characteristics, the additional optical element may simply be removed.

In some embodiments, the camera lens can be directly mounted to a lens mount of the camera while the additional optical element is inserted between the camera lens and the image sensor of the camera. In this respect, in some embodiments, when the additional optical element is inserted between the camera lens and the image sensor of the camera, the camera lens can be mounted to the camera in the same manner as for when the camera lens is mounted to the camera when the additional optical element is not inserted between the camera lens and the image sensor of the camera. Therefore, in some embodiments, the additional optical element may be inserted without causing a change to the distance measure of the camera lens (as the distance between a mounting surface of the camera lens and the image sensor of the camera).

For example, it may be provided for, that the additional optical element may firstly be mounted to the camera lens in order to then mount the camera lens to the lens mount of the camera. For this purpose, the additional optical element connected to the camera lens may, for example, be inserted into a cavity provided at a camera body of the camera and/or may project into such a cavity when the camera lens is mounted to the lens mount of the camera and the additional optical element is inserted between the camera lens and the image sensor of the camera.

Alternatively or additionally, it may also be provided for, that the camera lens and/or the camera comprise a receiver into which the additional optical element may be selectively inserted when the camera lens is mounted to the lens mount. For example, the additional optical element may be insertable into a slot provided on the camera in order to be positioned between the camera lens and the image sensor of the camera.

In some embodiments, the lens system may comprise a plurality of different additional optical elements with positive optical power that can be selectively inserted between the camera lens and the image sensor of the camera, and whose respective center thickness and optical power are matched to one another in such a way that, for the predetermined diaphragm setting of the camera lens, the flange focal distance defined by the camera lens remains unchanged by the insertion of the respective additional optical element. In addition, the plurality of additional optical elements may be configured to generate different respective spherical aberrations in an image recorded by the camera lens.

For such a lens system, effectively a set of a plurality of additional optical elements may be provided which may be selectively inserted between the camera lens and the image sensor of the camera without, however, changing the flange focal distance defined for the predetermined diaphragm setting of the camera lens. In particular, different additional optical elements may be provided in order to be able to reproduce the "look" of a respective vintage-lens or its imaging properties by inserting a respective additional optical element. In particular, the plurality of additional optical elements may have different optical powers and thus cause different degrees of aberrations. In particular, the surfaces of the plurality of additional optical elements may be formed differently in order to be able to generate different aberrations by inserting a respective additional optical element.

In some embodiments, the plurality of additional optical elements may have different lens deflections. In particular, the plurality of additional optical elements may have different aspherical curvatures, wherein, in particular surfaces of the additional optical elements facing away from the camera lens and/or surfaces of the additional optical elements facing towards the camera lens may have different aspherical curvatures. In addition, surfaces of the additional optical elements facing away from the camera lens and/or facing towards the camera lens may be formed aspherical at least in sections and/or may be formed planar at least in sections, in order to be able to generate different aberrations.

In general, surfaces of the plurality of additional optical elements facing away from the camera lens and/or facing towards the camera lens may thus be configured differently from one another. A surface of an additional optical element "facing away" or "facing towards" the camera lens may in particular refer to a correctly inserted state of the respective additional optical element.

Furthermore, the additional optical element of the lens system or the plurality of additional optical elements of the lens system may comprise one or more of the features already mentioned above in connection with the use of such an additional optical element or a plurality of such additional optical elements.

The invention also relates to a camera system comprising a camera having an image sensor and a lens system of the type described above.

In particular, the camera lens of the lens system may be adapted to the camera and designed to be mounted at the camera. The additional optical element or, in some embodiments, the plurality of additional optical elements may also be adapted to the camera lens and/or the camera so as to be insertable between the camera lens and the image sensor of the camera. For example, the additional optical elements may be attachable to an end section of the camera lens facing the camera or may be insertable into a receiver provided at the camera lens or at the camera.

The camera, in particular the camera for which the additional optical element may be used, may be configured in particular as a moving image camera.

The invention is explained below purely by way of example based on the embodiments with reference to the drawings.

Figure 2A:
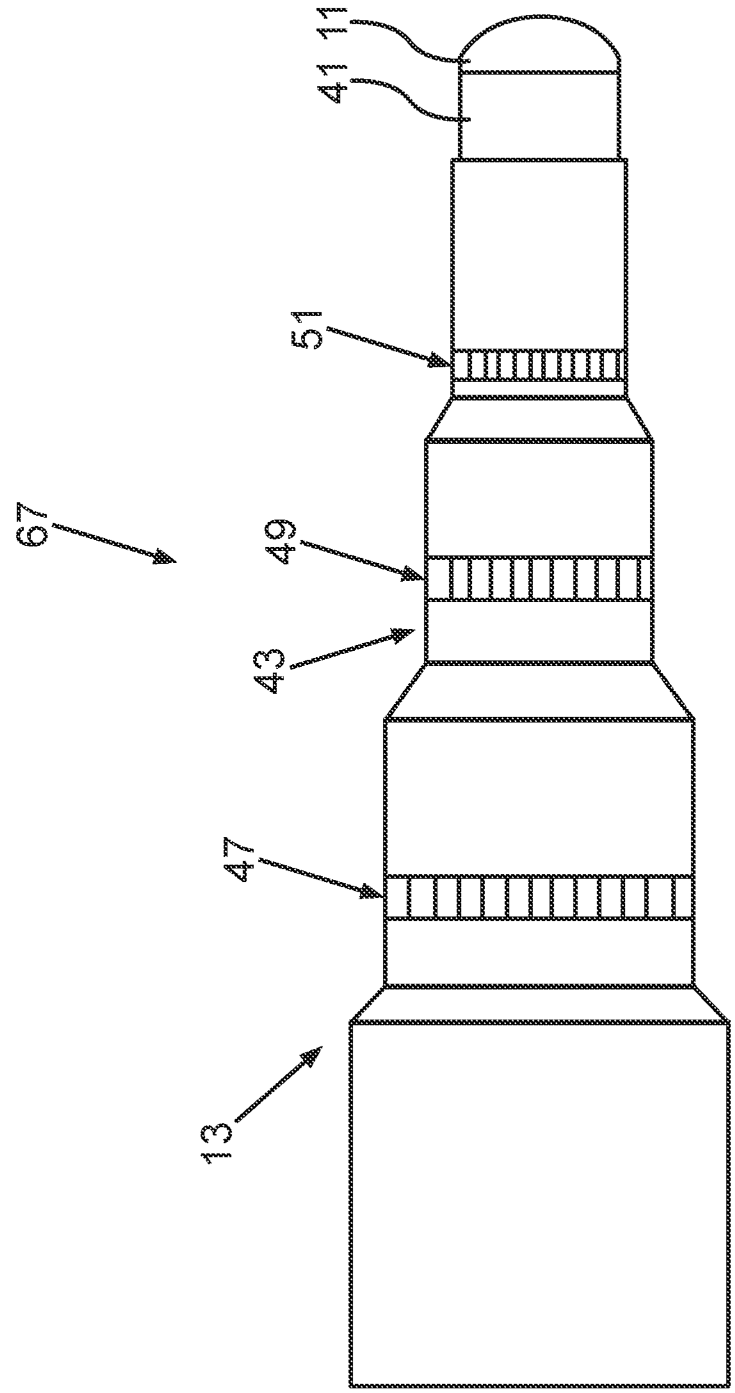
Figure 2B:
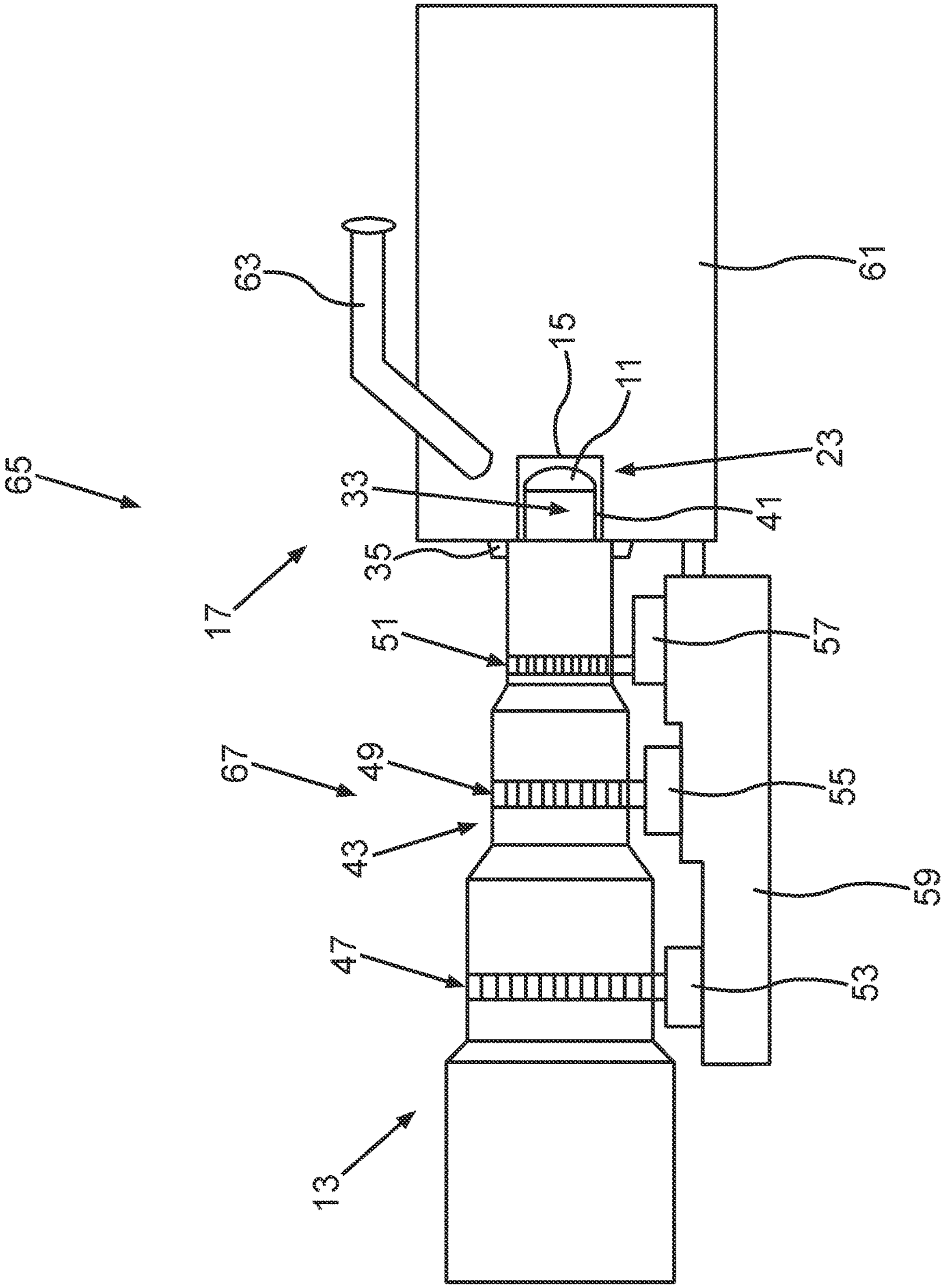
Figure 3:
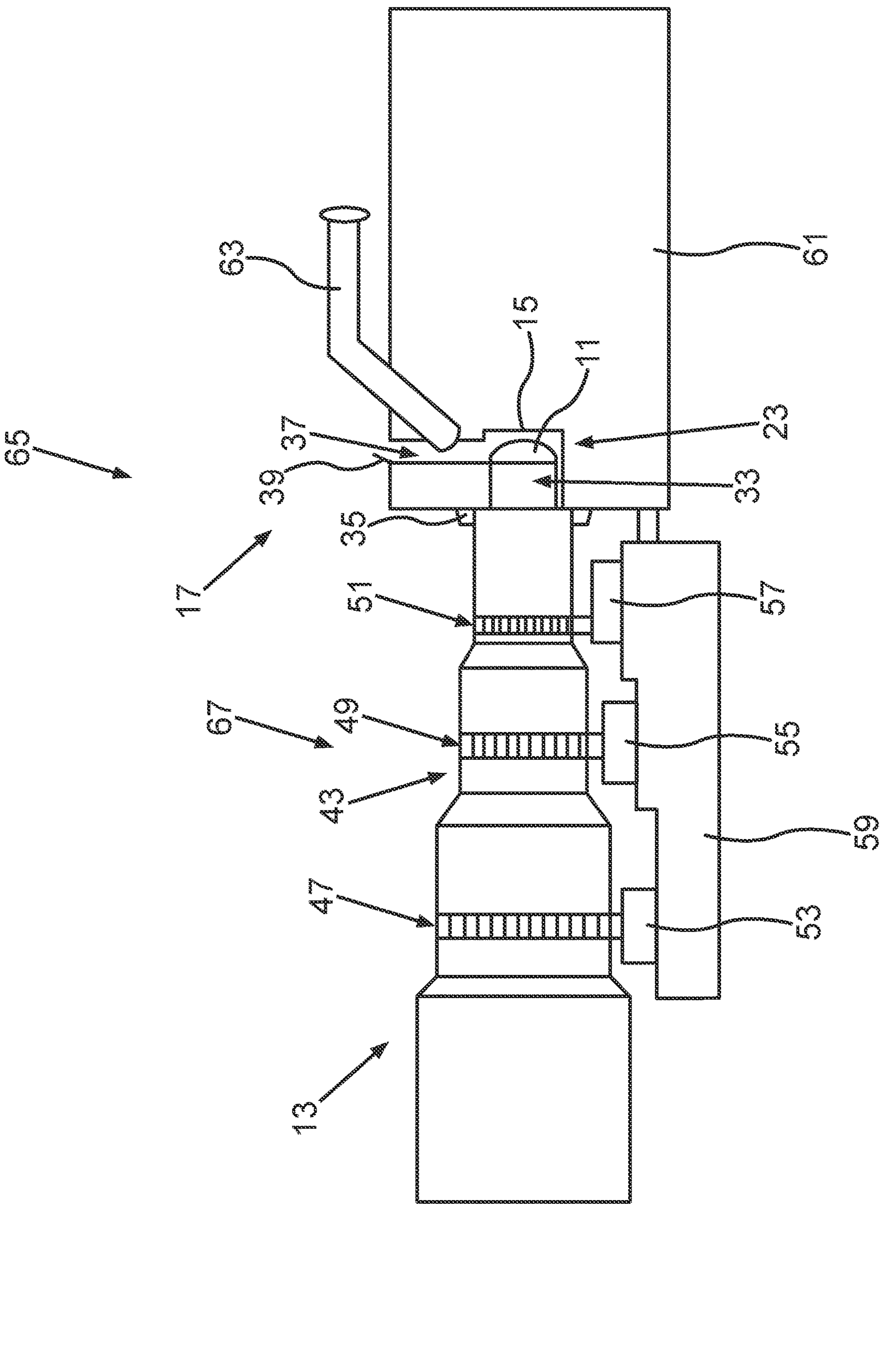
Figure 4A:
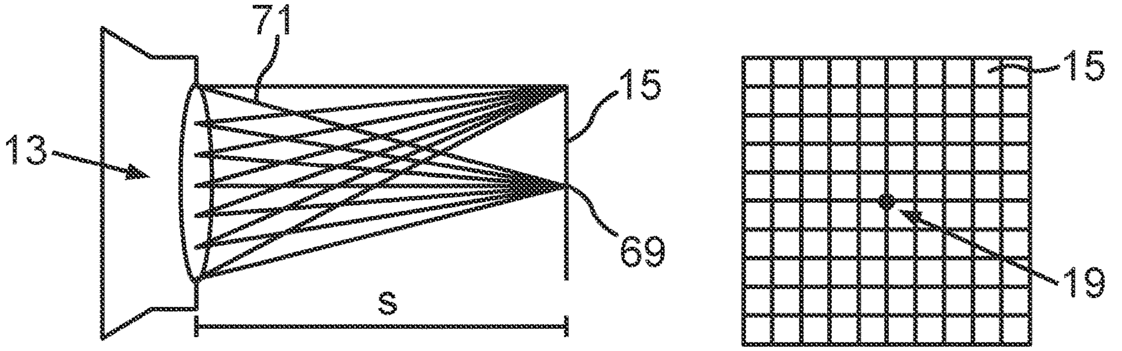
Figure 4B:
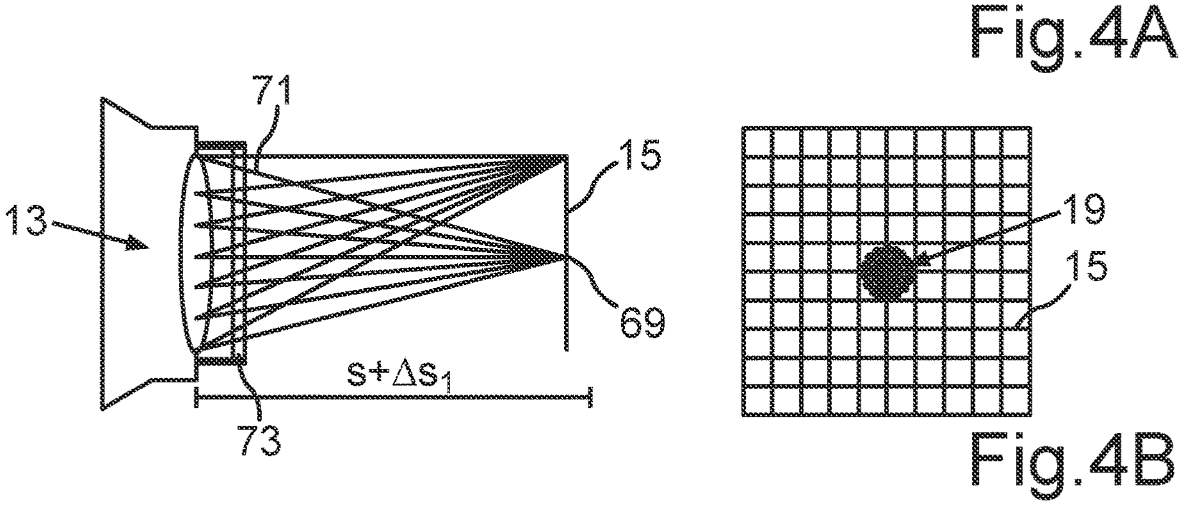
Figure 4C:
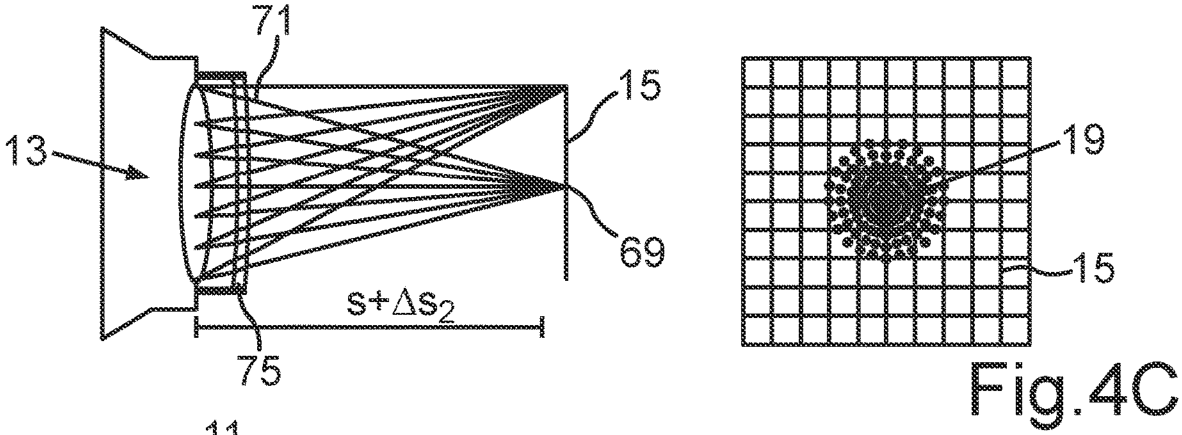
Figure 4D:
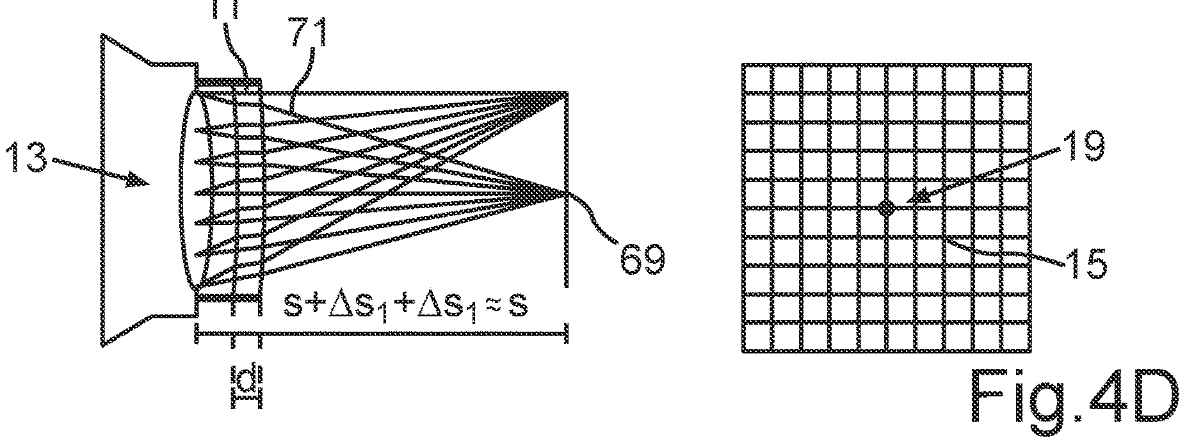
Figure 5A:
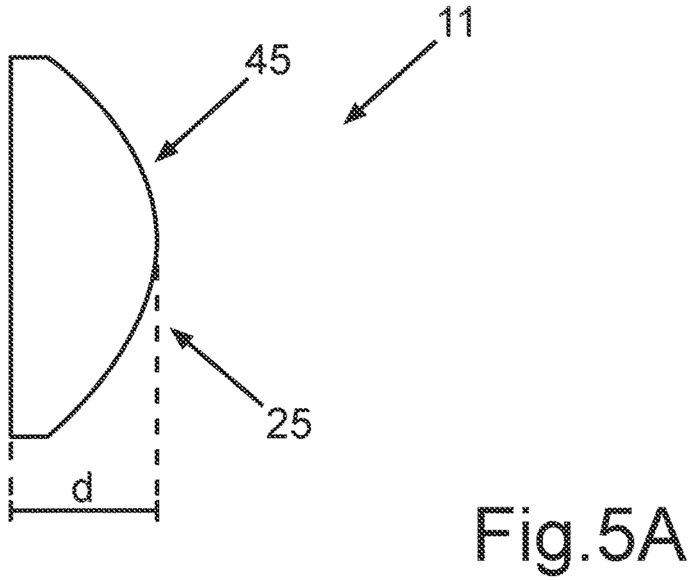
Figure 5B:
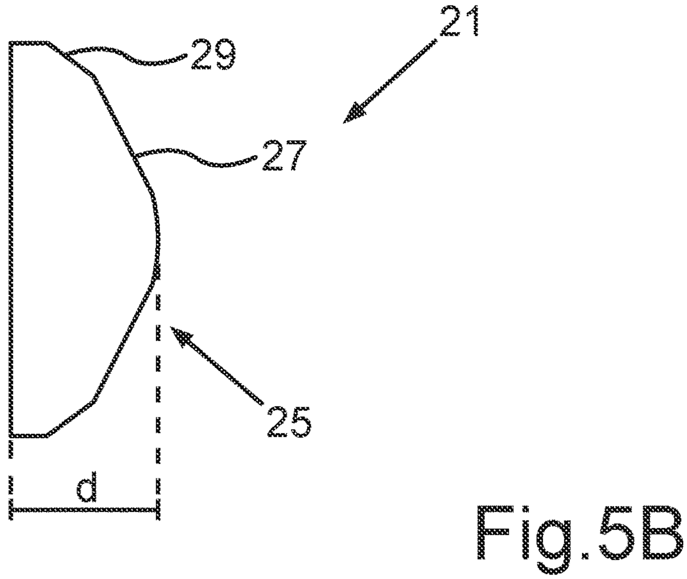
Figure 5C:
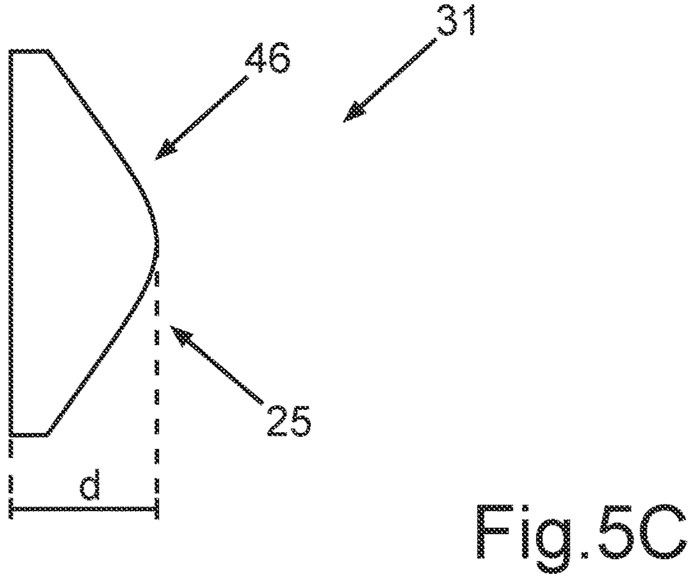

FIG. 1 shows a schematic view of a camera system comprising a camera and a lens system having a camera lens and a plurality of additional optical elements which may be selectively inserted between the camera lens and an image sensor of the camera, FIGS. 2A and 2B show respectively a schematic view of the lens system with an additional optical element attached to the camera lens, and a schematic view of the camera system with an additional optical element attached, FIG. 3 shows a schematic view of a further embodiment of the camera system, FIGS. 4A to 4D show a respective schematic view for illustrating a beam path through the camera lens and the impingement of the beam on the image sensor, when using the camera lens alone, when using a flat plate inserted between the camera lens and the image sensor, when using a thin converging lens inserted between the camera lens and the image sensor, and when using an additional optical element of a plurality of additional optical elements which is inserted between the camera lens and the image sensor, and FIGS. 5A to 5C show a respective schematic view of an additional optical element.

FIG. 1 shows a camera system 65 which comprises a camera 17 and a lens system 67. The lens system 67 comprises a camera lens 13 which can be selectively coupled to the camera 17, wherein the camera lens 13 is mountable to a lens mount 35 of the camera 17. In particular, the camera lens 13 may therefore be an interchangeable lens so that other camera lenses can also be selectively coupled to the camera 17. In particular, the camera 17 may be configured as a moving image camera.

The camera lens 13 is configured to direct light rays entering through a diaphragm 43 onto an image sensor 15 of the camera 17 and thereby produce an image 19 on the image sensor 15 (see also FIGS. 4A to 4D). For this purpose, the image sensor 15 is arranged at one end of a cavity 33 provided in a camera body 61 of the camera 17, so that light rays emerging from the camera lens 13 may only pass through the cavity 33 and impinge on the image sensor 15 without any further influence, whereby flat filter elements may certainly also be provided (not shown).

The camera lens 13 shown also comprises three lens rings 47, 49 and 51, which can be rotated by respective lens actuators 53, 55 and 57. By rotating the lens rings 47, 49 and 51, not shown optical elements, in particular lenses, of the camera lens 13 may be shifted relative to one another in order to adjust a focus and/or a zoom-factor, for example. In addition, by rotating one of the lens rings 47, 49 and 51, an opening of the diaphragm 43 may be adjusted, for example.

While in the embodiment shown, an actuation of the lens rings 47, 49 and 51 via respective lens actuators 53, 55 and 57 held at the camera body 61 via a holder 59 is shown by way of example, generally a manual actuation of the lens rings 47, 49 or 51, or commonly the lens rings of a camera lens 13, may also be provided in order to set parameters of the camera lens 13. However, actuation via the lens actuators 53, 55 and 57 may also enable a remote-controlled adjustment of the camera lens 13, for example.

In particular, the camera lens 13 may be set up to produce an image on the image sensor 15 that is as error-free as possible and therefore may be adjusted as precisely as possible with regard to any aberrations. However, especially when carrying out moving image recordings, it may be desirable to reproduce a certain "look" of an old or so-called vintage-lens, whereby this "look" may be characterized in particular by respective aberrations characteristic of the vintage lens. In order to be able to reproduce such a "look" and to be able to influence the optical image 19 produced by the camera lens 13 on the image sensor 15 with regard to such aberrations, the camera system 65 or the lens system 67 further comprises a plurality of additional optical elements 11, 21 and 31 with positive optical power, a respective one of which may be selectively inserted between the camera lens 13 and the image sensor 15 of the camera 17. In particular, the additional optical elements 11, 21 and 31 may be configured to generate spherical aberrations, so that for a recording with the camera lens 13 and the inserted additional optical elements 11, 21 or 31, the appearance may be created that the recording was carried out with an older or vintage-lens. However, the optical power of the additional optical elements 11, 21 and 31 is matched to a respective center thickness d of the additional optical elements 11, 21 and 31 such that, for a predetermined diaphragm setting of the camera lens 13, a flange focal distance defined by the camera lens 13 (i.e. a flange focal distance defined by the camera lens 13 which corresponds to the flange focal distance of the associated camera 17) remains substantially unchanged by the insertion of one of the additional optical elements 11, 21 and 31. In other words, the flange focal distance defined by the system of camera lens 13 and an additional optical element 11 corresponds to the flange focal distance defined by the camera lens 13 alone. This is explained in more detail below, in particular in relation to FIGS. 4A to 4D.

First, however, the lens system 67 is viewed again in FIG. 2A, wherein the additional optical element 11 is connected to the camera lens 13 via an optical holder 41. The additional optical element 11 may be held by the optical holder 41 magnetically or mechanically, for example. As FIG. 2B shows, the camera lens 13 with the connected additional optical element 11 may thereupon be coupled again directly to the camera 17 at the lens mount 35, whereby the additional optical element 11 held at the camera lens 13 may be inserted into the cavity 33 of the camera body 61 and may be inserted within a back focal distance 23 of the camera lens 13.

Since the camera lens 13 may be mounted directly at the lens mount 35 of the camera 17 even when the additional optical element 11 is inserted, the insertion of the additional optical element 11 does not change a mechanical distance measure of the camera system 65. Moreover, since—as will be explained below—a flange focal distance determined by the camera lens 13 for the predetermined diaphragm setting of the camera lens 13 also remains substantially unchanged by the insertion of the additional optical element 11, a focus scale of the camera lens 13 may thus be maintained even when the additional optical element 11 is inserted, so that the operation of the camera lens 13 is also not changed by the insertion of the additional optical element 11. Rather, the camera lens 13 may be controlled in the usual way, whereby by way of the additional optical element 11 only the "look" of the camera lens 13 may be adjusted in the desired way.

With regard to FIGS. 1, 2A and 2B, it should also be noted that the optical holder 41 is not shown to scale. Furthermore, the cavity 33 for accommodating the additional optical element 11 does not have to be formed in the camera body 61, but the additional optical element 11 may also be accommodated partially or fully in a cavity of the camera lens 13 facing the camera body 61.

FIG. 3 shows a further embodiment of the camera system 65 in which the camera body 61 comprises a receiver 37 into which the additional optical element 11 may be inserted. Also in this embodiment, the camera lens 13 may be directly mounted to the lens mount 35 of the camera 17 and is therefore independent of whether the additional optical element 11 is inserted or not, so that the insertion of the additional optical element 11 is not accompanied by a change in the mechanical flange focal distance. In order to prevent dust from entering the cavity 33, in particular also when the camera lens 13 is used without the additional optical element 11, a closure 39 is provided, by means of which the receiver 37 may be selectively closed.

FIGS. 4A to 4D illustrate the design of the additional optical element 11 in such a way that a flange focal distance defined by the camera lens 13 for a predetermined diaphragm setting of the camera lens 13 remains substantially unchanged by the insertion of the additional optical element 11, in that the optical power of the additional optical element 11 is matched accordingly to the center thickness of the additional optical element 11. Shown in FIGS. 4A to 4D, at first schematically at a respective left part of the figures, is a beam path of light rays 71 passing through the camera lens 13 and impinging on the image sensor 15, while at a respective right side of the figures is shown a generated image 19 at an image center 69 of the image sensor 15 or at a point of intersection between an optical axis of the camera lens 13 and the image sensor 15. The camera body, on whose lens mount the camera lens 13 rests, is not shown here.

FIG. 4A shows firstly a beam path through the camera lens 13 without the additional optical element 11 or any other optical element being inserted between the camera lens 13 and the image sensor 15. The camera lens 13 is shown in a setting in which light rays 71 incident on the camera lens 13 and parallel to the optical axis are focused on the image sensor 15. Also shown is the flange focal distance s of the camera lens 13 defined by the camera lens 13.

FIG. 4B shows the beam path with no change to the setting of the camera lens 13, but having a flat plate 73 inserted between the camera lens 13 and the image sensor 15. The insertion of this flat plate 73 leads to a displacement of the focus point away from the camera lens 13, which may be described as an increase of the glass path. In this respect, a focus point lies behind the image sensor 15 as a result of the insertion of the flat plate 73, so that a flange focal distance of the optical system which comprises the camera lens 13 and the flat plate 73, is increased by a value $\Delta s_1$ compared to the flange focal distance s of the bare camera lens 13.

FIG. 4C schematically shows the insertion of a thin converging lens 75 between the camera lens 13 and the image sensor 15. The thin converging lens 75 has a positive optical power, so that the insertion of the converging lens 75 is accompanied by a shift of the focus point towards the camera lens 13. The optical system which comprises the camera lens 13 and the thin converging lens 75, therefore has a flange focal distance that is reduced by a negative value $\Delta s_2$ compared to the flange focal distance s of the bare camera lens 13.

The additional optical elements 11, 21 and 31 used according to the invention are thus designed in such a way that the increase in the flange focal distance shown in FIG. 4B due to introducing a glass path into the beam path, and the decrease of the flange focal distance shown in FIG. 4C due to introducing a converging lens, especially compensate each other. This is shown in FIG. 4D. The optical system, which comprises the camera lens 13 and the additional optical elements 11, 21 or 31 inserted between the camera lens 13 and the image sensor 15, therefore continues to have the flange focal distance s which is defined by the camera lens 13 itself (i.e. without the additional optical element), at least for a certain setting of the diaphragm 43 of the camera lens 13. Therefore, the following at least substantially applies: $s+\Delta s_1+\Delta s_2=s$. As already mentioned, the center thickness d of the additional optical element 11 and its optical power are particularly matched to one another in such a way that the increase of the glass path determined by the center thickness d and the decrease of the focal length determined by the optical power, balance each other out and the flange focal distance remains substantially unchanged. The insertion of the additional optical elements 11, 21 or 31 thus makes it possible to introduce optical aberrations in the image 19 in a desired manner without, however, influencing a focus setting specified by the camera lens 13.

FIGS. 5A to 5C show examples of possible embodiments of additional optical elements 11, 21 and 31. The additional optical element 11 shown in FIG. 5A has an aspherical curvature 45 on a surface 25 facing away from the camera lens 13, so that a respective refraction of light rays impinging on the additional optical element 11 is dependent on an exit location of a respective light ray from the additional optical element 11. This allows the generation of location-dependent aberrations in the image 19 generated on the image sensor 15.

In the embodiment of the additional optical element 21 shown in FIG. 5B, the surface 25 of the additional optical element 21 facing away from the camera lens 13 comprises a plurality of flat surfaces 27 and 29, which extend at different angles to the optical axis of the camera lens 13.

In the embodiment of the additional optical element 31 according to FIG. 5C, the surface 25 facing away from the camera lens 13 is again irregularly curved and has a further curvature 46 which differs in particular from the curvature 45 of the embodiment of the additional optical element 11 according to FIG. 5A.

Alternatively or additionally, the surfaces of the additional optical elements 11, 21, 31 facing the camera lens 13 may also have the shapes and curvatures described.

In this respect, the surfaces 25 of the additional optical elements 11, 21 and 31 differ from one another so that each of the additional optical elements 11, 21, 31 may generate respective characteristic optical aberrations when the additional optical element 11, 21 or 31 is inserted between the camera lens 13 and the image sensor 15. However, for all additional optical elements 11, 21 and 31, the center thickness d, a respective type of glass and a curvature of the surface 25 in the region of the optical axis may be matched to one another in such a way that a glass path increase determined by the center thickness d and the positive optical power of the additional optical elements 11, 21 or 31 especially compensate each other and a flange focal distance s determined by the camera lens 13 remains substantially unchanged by the insertion of one of the additional optical elements 11, 21 and 31. In particular, the additional optical elements 11, 21 and 31 may make it possible to influence a sharpness of the image 19 and/or a sharpness contour within the image 19, in particular from the image center 69 to respective edge regions of the image sensor 15, and to increasingly reduce the sharpness, in particular in the direction of the image edges, in order to thereby achieve a desired "look" or a desired bokeh.

LIST OF REFERENCE NUMERALS

11 additional optical element
13 camera lens
15 image sensor
17 camera
19 image
21 additional optical element
23 back focal distance
25 surface
27 flat surface
29 flat surface
31 additional optical element
33 cavity
35 lens mount
37 receiver
39 closure
41 optical holder
43 diaphragm
45 curvature
46 curvature
47 lens ring
49 lens ring
51 lens ring
53 lens actuator
55 lens actuator
57 lens actuator
59 holder
61 camera body
63 viewfinder
65 camera system
67 lens system
69 image center
71 light rays
73 flat plate
75 converging lens
d center thickness
S flange focal distance
Δs1 increase of the flange focal distance
Δs2 decrease of the flange focal distance

The invention claimed is:

1. Use of an additional optical element with a positive optical power for influencing an optical image produced by a camera lens on an image sensor of a camera by inserting the additional optical element between the camera lens and the image sensor of the camera, wherein the center thickness of the additional optical element and the optical power of the additional optical element are matched to one another in such a way that, for a predetermined diaphragm setting of the camera lens, a flange focal distance defined by the camera lens remains substantially unchanged by the inserting of the additional optical element.

2. Use of an additional optical element according to claim 1, wherein the additional optical element is configured to generate spherical aberrations.

3. Use of an additional optical element according to claim 1, wherein the additional optical element is inserted within the back focal distance of the camera lens.

4. Use of an additional optical element according to claim 1, wherein at least one surface of the additional optical element is formed aspherical, at least in sections.

5. Use of an additional optical element according to claim 1, wherein at least one of a surface of the additional optical element facing away from the camera lens or a surface of the additional optical element facing the camera lens has an irregular curvature.

6. Use of an additional optical element according to claim 1, wherein the additional optical element is accommodated in a cavity between the camera lens and the camera.

7. A lens system comprising a camera lens which can be selectively coupled to a camera and an additional optical element with a positive optical power which is insertable between the camera lens and an image sensor of the camera, wherein the center thickness of the additional optical element and the optical power of the additional optical element are matched to one another in such a way that, for a predetermined diaphragm setting of the camera lens, a flange focal distance defined by the camera lens remains substantially unchanged by the insertion of the additional optical element.

8. A lens system according to claim 7, wherein the camera lens is directly mountable to a lens mount of the camera while the additional optical element is inserted between the camera lens and the image sensor of the camera.

9. A lens system according to claim 7, wherein the lens system comprises a plurality of different additional optical elements with positive optical power which can be selectively inserted between the camera lens and the image sensor of the camera and whose respective center thickness and optical power are matched to one another in such a way that, for the predetermined diaphragm setting of the camera lens, the flange focal distance defined by the camera lens remains unchanged by the insertion of the respective additional optical element, wherein the plurality of additional optical elements are configured to generate different respective spherical aberrations in an image recorded by the camera lens.

10. A lens system according to claim 9, wherein the plurality of additional optical elements have different lens deflections.

11. A camera system comprising a camera having an image sensor, and a lens system according to claim 7.

* * * * *